Feb. 14, 1933. R. HAWKINS 1,897,194
SIPHON CREAM REMOVER
Filed June 4, 1932
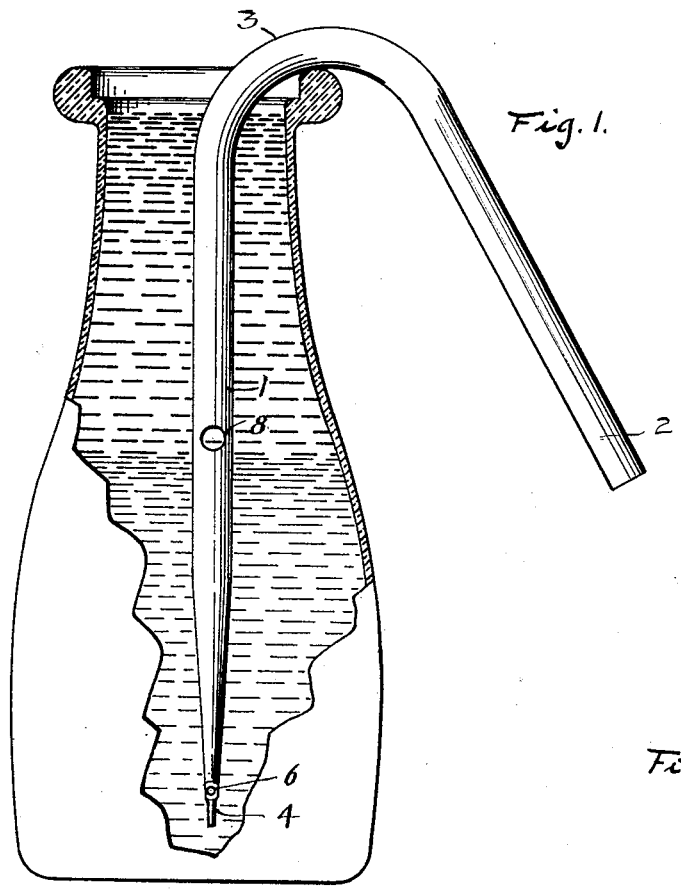
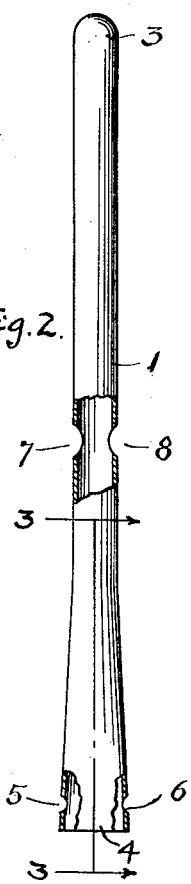
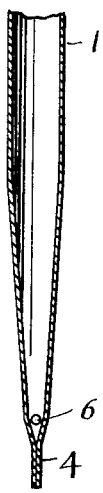
INVENTOR,
Rollyn Hawkins,
By Minturn & Minturn,
Attorneys.

Patented Feb. 14, 1933

1,897,194

UNITED STATES PATENT OFFICE

ROLLYN HAWKINS, OF INDIANAPOLIS, INDIANA

SIPHON CREAM REMOVER

Application filed June 4, 1932. Serial No. 615,275.

The object of this invention is to provide a siphon acting device which will be self starting for the removal of cream from above the milk in common milk bottles.

Another object is to provide such a device which will be quick to start its action and speedy in the completion of the removal of the cream.

Other objects and advantages will be disclosed in the accompanying specification and shown in the drawing, in which, Fig. 1 is a view in side elevation of my invention in a milk bottle, as applied to remove the cream from the bottle. The top of the bottle is broken away and vertically sectioned;

Fig. 2 is an elevation and partial vertical section of my device, turned at right angles to its position in Fig. 1 and looking at the side farthest from the discharge, and Fig. 3 is a fragment showing the lower end of the device in vertical section on the line 3—3 of Fig. 2.

Like characters of reference indicate like parts in the several views.

Referring to the drawing, it will be apparent that my device is essentially a tube having a body portion 1 connected with a discharge spout 2 by a goose-neck 3.

The extreme lower end 4, of the body 1, is closed by flattening the sides together. This flattening produces a widening toward the bottom in one direction as shown in Fig. 2, and an upward widening in a plane at right angles thereto as shown in Fig. 3. Just above the bottom closure, in the two opposite walls of the widened portion are the small holes 5 and 6, and formed through the walls of the body portion 1 are the two diametrically opposite inflow orifices 7 and 8.

In operation when the device is placed in a bottle as shown in Fig. 1, the cream is forced through orifices 7 and 8 by atmospheric pressure upon the top of the cream and rises to the level of the cream outside.

This action is more rapid than when a single orifice is used, for the reasons that the combined entrance areas are larger and because the impact against the tube wall resulting from flow on a single side is counteracted by the flow from the other side and the combined pressure is upward. I have found also that the cream will rise to a higher level when two holes are thus used, than with a single inlet opening.

I have also by repeated use of the device and by repeated experiments found that by closing the lower end of the body portion 1 and forming the diametrically opposite holes 5 and 6 the discharge of the cream will be hastened and that the time will be further shortened and the mixing of the milk with the cream at their level of separation reduced by flattening and tapering the lower end of the body portion in the manner shown and described.

While I have here shown the best embodiment of my invention known to me, and with considerable detail, other variations and adaptations may be resorted to without departing from the spirit of my invention as here claimed.

I claim:

1. A siphon device comprising a body portion closed at its lower end and tapering on two opposite sides toward said closure, said end having an aperture through two of its most distantly separated walls near the closure, a downwardly discharging spout and a goose neck connecting the upper body and spout portions, the body portion being laterally apertured on two diametrically opposite sides in the upper portion for the inflow of liquid.

2. A siphon comprising a tubular body portion having a lower end closed by pressing two of the opposite sides of the tube into contact with each other with a gradual taper thereabove, said end having an aperture through two of its most distantly separated walls near the closure, a downwardly discharging spout and a goose neck connecting the upper body and spout portions, the body portion being laterally apertured in two diametrically opposite sides in the upper portions for the inflow of liquid.

In testimony whereof I affix my signature.

ROLLYN HAWKINS.